United States Patent [19]

Gelles et al.

[11] Patent Number: 5,118,733

[45] Date of Patent: Jun. 2, 1992

[54] ASPHALT-BLOCK COPOLYMER PAVING COMPOSITION

[75] Inventors: Richard Gelles; James H. Collins; Mark G. Bouldin, all of Houston, Tex.

[73] Assignee: Shell Oil Company, Houston, Tex.

[21] Appl. No.: 810,547

[22] Filed: Dec. 19, 1991

Related U.S. Application Data

[63] Continuation-in-part of Ser. No. 711,428, Jun. 6, 1991, abandoned, which is a continuation-in-part of Ser. No. 606,392, Oct. 31, 1990, abandoned.

[51] Int. Cl.⁵ .............................................. C08L 95/00
[52] U.S. Cl. .................................... 524/68; 106/281.1
[58] Field of Search ......................... 524/68; 106/281.1

[56] References Cited

U.S. PATENT DOCUMENTS

| Re. 27,146 | 6/1971 | Jones ............................. 260/880 |
| 3,345,316 | 10/1967 | Nielsen ........................... 260/28.5 |
| 3,611,888 | 10/1971 | Kavalir et al. ........................ 94/18 |
| 3,856,732 | 12/1974 | Bresson et al. ................... 260/28.5 |
| 3,978,014 | 8/1976 | van Beem et al. ................. 260/28.5 |
| 4,032,491 | 6/1977 | Schoenke ........................ 260/28.5 |
| 4,172,061 | 10/1979 | Bresson ........................... 260/28.5 |
| 4,250,067 | 2/1981 | Bresson ........................... 260/28.5 |
| 4,282,127 | 8/1981 | Desgouilles ..................... 260/28.5 |
| 4,332,703 | 6/1982 | Lijzenga et al. ....................... 524/68 |
| 4,368,228 | 1/1983 | Gorgati ............................. 428/110 |
| 4,412,019 | 10/1983 | Kraus ................................. 524/71 |
| 4,490,493 | 12/1984 | Mikols ................................ 524/68 |
| 4,503,176 | 3/1985 | Barlow et al. ...................... 524/62 |
| 4,738,996 | 4/1988 | Vonk et al. ......................... 524/59 |
| 4,835,199 | 5/1989 | Futamura et al. ................... 524/66 |

FOREIGN PATENT DOCUMENTS

| 740027 | 8/1966 | Australia . |
| 859226 | 12/1970 | Canada ................................. 400/41 |
| 0234615 | 9/1987 | European Pat. Off. . |
| 0238149 | 9/1987 | European Pat. Off. . |
| 0280357 | 8/1988 | European Pat. Off. . |
| 0285865 | 10/1988 | European Pat. Off. . |
| 0299499 | 1/1989 | European Pat. Off. . |
| 63-268766 | 11/1988 | Japan . |
| 1130140 | 10/1968 | United Kingdom . |
| 1143895 | 2/1969 | United Kingdom . |
| 1279644 | 6/1972 | United Kingdom . |
| 1284726 | 8/1972 | United Kingdom . |
| 1329298 | 9/1973 | United Kingdom . |
| 1338477 | 11/1973 | United Kingdom . |
| 1554739 | 10/1979 | United Kingdom . |

OTHER PUBLICATIONS

Letter from Inventor to Grant Mitchell dated May 25, 1989.

*Primary Examiner*—Paul R. Michl
*Assistant Examiner*—Peter Szekely
*Attorney, Agent, or Firm*—Donald F. Haas

[57] ABSTRACT

An improved paving composition comprising:
(a) from about 80 parts to about 99 parts per hundred of aggregate, and
(b) from about 1 part to about 20 parts per hundred of a bituminous composition which is comprised of
   (1) from about 88 parts to about 99.5 parts per hundred of a bituminous component having a DEN of greater than 100 and
   (2) from about 0.5 parts to about 12 parts per hundred of a hydrogenated block copolymer of a monoalkenyl aromatic hydrocarbon and a conjugated diolefin having a contour arm molecular weight before hydrogenation of from about 80,000 to about 150,000 and a polystyrene content of from about 20% to about 40%.

19 Claims, No Drawings

5,118,733

ASPHALT-BLOCK COPOLYMER PAVING COMPOSITION

This is a continuation-in-part, of application Ser. No. 711,428, filed Jun. 6, 1991 now abandoned which is itself a continuation-in-part of Ser. No. 606,392 filed Oct. 31, 1990 now abandoned.

BACKGROUND OF THE INVENTION

Asphalt is a common material utilized for the preparation of paving materials. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt binder. Each of these added materials modifies the asphalt in one respect or another but certain deficiencies can be noted in all modifiers proposed. For example, some of them improve only the high temperature performance of asphalt, some only improve the low temperature performance of asphalt, while some lack thermal stability or mixing stability with asphalt.

Since the late 1960s, styrene-butadiene rubber and styrene-rubber block copolymers such as styrene-butadiene-styrene and styrene-isoprenestyrene block copolymers have been used to dramatically improve the thermal and mechanical properties of asphalts. Practical application of the rubber addition approach requires that the blended product retain improved properties and homogeneity during transportation, storage and processing. Long term performance of elastomer-modified asphalts also depends on the ability of the blend to maintain thermal and chemical stability.

To be suitable for paving materials, the asphalt-block copolymer mixtures should meet the following requirements:

(a) The block copolymer must be mixable in asphalt and stay mixed during subsequent processing.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stressed also contribute. The block copolymer will lower the temperature at which cracking will occur. This characteristic is more important in cold climates.

These block copolymers are necessary to obtain improved bituminous compositions, specifically for paving, and specifically for hot mix asphalt concrete (HMAC). The polymer is added to the bitumens for hot mix asphalt concrete to improve its resistance to deformation caused by traffic loading especially at warm times of the year (rutting resistance), as well as improved resistance to cracking caused by both traffic and thermally induced loads, especially at cold times of the year. It is also necessary that the polymer by easy to mix with the bitumen and that the two do not demix during storage or processing. The polymers must be oxidatively stable during processing and during long term aging on the road.

Temperature susceptibility of a polymer modified asphalt is a major consideration. Ideally, one would want a binder (asphalt and polymer) which would be "hard" and elastic at elevated temperatures to resist permanent deformation and "soft" and strong at low temperatures to resist cracking. In other words, the ideal system should not only exhibit enhanced resistance to deformation but also should resist cracking.

At the present time, unhydrogenated block copolymers are being used in paving applications. Unhydrogenated block copolymers have certain disadvantages which can cause problems when used in applications such as these. Such disadvantages include poor stability of the block copolymer during blending and storage of the bituminous composition and poor long term stability when the bituminous composition is exposed to the elements (by stability we mean resistance to degradation).

SUMMARY OF THE INVENTION

This invention relates to a composition for use in paving applications. The composition comprises aggregate containing from about 1 part to about 20 parts of a bituminous composition comprising from about 88 to about 99.5 parts per hundred of a bituminous component having a Pen greater than 100 and from about 0.5 to about 12 parts per hundred of a hydrogenated block copolymer of a monoalkenyl aromatic hydrocarbon and a conjugated diolefin having a contour arm molecular weight before hydrogenation of from about 80,000 to about 150,000 and a polystyrene content of from about 20% to about 40%.

DETAILED DESCRIPTION OF THE INVENTION

The bituminous component in the bituminous-block copolymer compositions according to the present invention may be a naturally occurring bitumen or derived from a mineral oil. Also petroleum derivatives obtained by a cracking process, pitch and coal tar can be used as the bituminous component as well as blends of various bituminous materials.

The bituminous component must have a PEN, penetration at 25° C. for 100 grams for 5 seconds in decimillimeters (dmm), which is greater than 100. This results in a paving composition having improved rutting resistance as evidenced by higher values of G' as described below.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues. Bitumens which contain less than 11% n-pentane asphaltenes are more compatible with these polymers and thus are more easily mixed and will stay mixed. The amount of bituminous component to be used in the bituminous compositions of the present invention range from about 88 to 99.5 parts per hundred. The preferred range is more than about 93 to about 99 parts per hundred.

The block copolymer component is a hydrogenated block copolymer of a monoalkenyl aromatic hydrocarbon such as styrene and a conjugated diolefin such as butadiene or isoprene. Such elastomeric block copolymers can have general formulas A—B—A or (AB)$_n$X wherein each A block is a monoalkenyl aromatic hydrocarbon polymer block, each B block is a conjugated diolefin polymer block, X is a coupling agent, and n is an integer from 2-30. Such block copolymers may be linear or may have a radial or star configuration as well as being tapered. Block copolymers such as these are well known and are described in many patents including U.S. Pat. No. 27,145 issued Jun. 22, 1971 which describes hydrogenated block copolymers containing butadiene. This patent is herein incorporated by reference. Hydrogenation levels in the elastomeric block of 95% and 98% and more are preferred. The description of the type of polymers, the method of manufacturing the polymers and the method of hydrogenation of the polymers is described therein and is applicable to the production of block copolymer containing other alkenyl aromatic hydrocarbons and other conjugated diolefins such as isoprene or mixtures of conjugated diolefins.

The hydrogenated block copolymers of the present invention are used in the bituminous composition in an amount from about 0.5 to about 12 parts per hundred. If less than about 0.5 parts of the block copolymers are used, then the desired improvement in properties is not sufficiently significant. The properties improve as the amount of block copolymer increases but the overall cost also goes up. More than about 12 parts will likely cause the composition to become too elastomeric and thus, difficult to process. The preferred range is from about 1 part to less than about 7 parts per hundred. If less than about 1 part are used, there is not much improvement except with very compatible asphalts. More than about 7 parts is not necessary for most applications and increases the cost. Negatives at higher loadings include difficulties in processing due to high viscosities.

The block copolymer should have a molecular weight before hydrogenation of from about 80,000 to about 150,000. If the molecular weight is less than about 80,000 adding the polymer does not significantly improve the properties of the asphalt. Especially in the case of asphalts which have an n-pentane asphaltenes content of above 11%, if the molecular weight is above about 150,000, the polymer and the asphalt will not mix properly and will not stay mixed. If a lower n-pentane asphaltene content asphalt is used, the mixing time is greater at higher molecular weights. For asphalts containing higher amounts of asphaltenes, i.e. more than 11%, the preferred molecular weight range is from about 80,000 (because the properties are much improved at this point) to about 130,000 (because demixing can occur with polymers of a higher molecular weight). For asphalts containing lower amounts of asphaltenes, i.e. less than 11%, the preferred range of operation is from about 90,000 to about 150,000 molecular weight. Such asphalts are more compatible with higher molecular weight block copolymers. The most preferred range in which the best results are obtained is from about 110,000 to about 125,000. The molecular weights referred to herein are peak molecular weights determined by gel permeation chromatography (GPC).

The molecular weight ranges referred to herein are the contour arm molecular weights. Radial and star polymers have much higher total molecular weight than linear polymers do but the mechanical properties considered herein are dependent not upon the total molecular weight in the case of radial and star polymers but rather on the molecular weight of the contour arms of those polymers. For a linear A—B—A polymer, the contour molecular weight is the same as the total molecular weight and the most preferred molecular weight range of the present invention is from about 110,000 to about 125,000 for linear polymers. For three arm radial polymers, one must multiply the contour arm molecular weight by 1.5 to obtain the total molecular weight. Thus, the most preferred total molecular weight range for a three arm polymer of the present invention would be from about 165,000 to about 187,500. For a four arm radial polymer, the most preferred range would be two times the contour molecular weight range or from about 220,000 to about 250,000. In general, for a coupled radial or star polymer (AB)$_n$X, the contour molecular weight is the molecular weight along the contour of the molecule, which is (AB)$_2$. Thus, for a coupled radial or star polymer (AB)$_n$X, the total molecular weight range is n/2 times the contour molecular weight range.

In order to be effective in the present application, the block polymer may have a polystyrene content (PSC) ranging from about 20% to about 40%. If the polystyrene content is lower than about 20%, the physical properties are decreased and the molecular weight of the polymer would have to be much higher to get the proper physical properties and increasing the molecular weight causes mixing problems as stated above. Increasing the molecular weight also increases the cost of the polymer. Therefore, it is preferred that the PSC be about 25% to about 40%. However, with very incompatible asphalts, a styrene content as low as 15% may be required to prevent demixing during processing. At this low a PSC, the molecular weight should be at the high end of the range. If the polystyrene content is above about 40%, the bituminous component and the block polymer component are generally too hard to mix. The elastomeric properties tend to decrease because of the presence of a continuous styrene phase in the polymer.

In systems in which demixing is not an issue, and especially for compositions in which the block copolymer is not the major component, then rheological properties, such as resistance to flow, tend to improve as the molecular weight of the polymer increases. However, higher molecular weight polymers are expensive to manufacture and more difficult to process and mix. On the other hand, intermediate molecular weight block copolymers with reasonable polystyrene contents are easy to process and mix yet perform better than homopolymer or block copolymers of equivalent molecular weights with low styrene contents. Thus, it is desirable to use intermediate molecular weight polymers with as high a polystyrene content as possible. Limitations in styrene content are caused by a loss of elasticity at too high a polystyrene content and, for the specific case of asphalt blends, by a decrease in compatibility if the styrene content is too high. Homopolystyrene is not compatible in most asphalts.

The compositions of the present invention may contain other materials such as fillers including carbon black, gilsonite, calcium carbonate, limestone, chalk, ground rubber tires, etc. Other materials which may be incorporated in these compositions include unsaturated block copolymers like SBS or SIS, etc. If other materials are added, the relative amounts of the bitumen and polymer specified above remain the same.

The bituminous block copolymer compositions of the present invention may be prepared by various methods. A convenient method comprises blending of the two components at an elevated temperature such as 150° C.

to 250° C. Other methods for preparing the composition of the present invention include precipitation or drying of the components from a common solvent and emulsifying the polymer with an asphalt emulsion.

The bituminous block copolymer compositions of the present invention are intended to be mixed with aggregate material to form hot mix asphalt concrete and other paving materials. The bituminous composition is the binder which holds the aggregate, which is basically rocks and sand, together. The paving composition is comprised of from about 1 part to about 20 parts per hundred of the bituminous-block copolymer composition and from about 80 to about 99 parts per hundred of aggregate. It is preferred that the bituminous block copolymer composition comprise from about 2 to about 8 parts per hundred because an optimum binder content gives the best rutting resistance and prevents things like ravelling (pullout of aggregate from binder when not enough binder is used).

All of the block copolymers used in the following examples are hydrogenated block copolymers of styrene and butadiene. All of these block copolymers are hydrogenated in the elastomeric block to a degree greater than 95%.

The asphalts examined herein were characterized by clay gel analysis (ASTM D2007). The results are given below:

TABLE 1

| Asphalt | Saturates % | Aromatics % | Polars % | n-Pentane Asphaltenes % |
|---|---|---|---|---|
| Martinez Ar-1000 | 15.5 | 35.2 | 39.9 | 9.4 |
| Deer Park AC-5 | 16.9 | 39.7 | 31.5 | 11.9 |
| Deer Park AC-20 | 13.9 | 38.8 | 34.1 | 13.2 |

Based on this method, a simple correlation is apparent between asphalt performance and structure. Asphalts with low n-pentane asphaltenes, less than about 11%, are very compatible, easy to mix and perform well with a wide range of hydrogenated block copolymers. Asphalts with n-pentane asphaltenes above 11% are not very compatible or easy to mix with high molecular weight hydrogenated block copolymers and only perform well with "optimized" hydrogenated block copolymers. The following examples provide support for this conclusion.

RHEOLOGY METHOD

Small amplitude oscillatory shear experiments with a Rheometrics RMS800 with plate-plate geometry was used to characterize the polymer modified asphalts discussed hereafter. Details on the method can be found in a paper entitled "Rheology and Microstructure of Polymer/Asphalt Blends" by M. Bouldin, J. H. Collins and A. Berker presented at the 1990 meeting of the Rubber Division of the American Chemical Society. For the present work, we focused on rheology at 60° C. because rutting takes place faster at higher temperatures. 60° C. is not an atypical temperature for a black road in a hot climate. We also show data at both high and low frequencies although rutting takes place faster when the load is experienced over longer times (lower frequencies). Data at frequencies of 0.1 and 1.0 radians per second are reported but we focused on the low frequency data because that data is a better predictor of rutting resistance. The elastic component of the storage modulus, $G'$, rather than the total shear modulus, $G^*$, was focused upon because for elastomeric (visco-elastic) polymer modified asphalts such as those containing styrenic block copolymers, the elastic component is most important in determining the response to rutting. For the case of a load put on a pavement for a finite amount of time, $G^*$, the total resistance to deformation will control the initial deformation. However, when $G'$, the elastic component of the shear modulus, is large, the pavement will elastically recover so the final deformation will be low. The value of $G'$ at low frequencies and higher temperatures is the critical criterion to use when comparing elastomeric polymer modified asphalts.

MOLECULAR WEIGHT

The molecular weights referred to herein are peak molecular weights determined by gel permeation chromatography (GPC).

RTFO (ROLLING THIN FILM OVEN) TEST

This test was used in the following examples. It simulates the aging experienced during preparation of the hot mix prior to application. The test is determined by ASTM D2872.

THERMAL CRACKING METHOD

The thermal cracking temperature of binders is determined by the following method:

| | |
|---|---|
| Scope | This method describes the determination of the thermal cracking temperature of an adhered film of asphalt or polymer-modified asphalt. |
| Apparatus | Test substrate: Standard ASTM concrete test blocks, size 3" × 5" × 15/16", available from Dan Moore Inc., 405 Albertson Road, Thomasville, North Carolina 27360, (919) 475-8350. |
| | Wet film applicator designed to apply a 2-inch wide, 150-mil film, available from Precision Gauge & Tool Company, 28 Volkenand, Dayton, Ohio, 45410, (513) 254-8404. |
| | Lighted, windowed, forced-draft environmental chamber, capable of cooling at a constant rate to −70° C. The chamber used for development of this test is model TB/5 from Standard Environmental Systems, 3×3 Mannisink Road, Totowa, New Jersey, 07512, (201) 256-2200. |
| | Hot knife, model #ZETZ-8, available from Abbeon Cal, Inc., 123-219A Gray Avenue, Santa Barbara, California 93101, (805) 966-0816. |
| Preparation of test samples | Heat binder and wet film applicator to ~120° C. The binder must be sufficiently fluid to pour. Pour 10-12 g of the binder onto one of the 3" × 5" surfaces of the substrate, and use the hot applicator to apply a layer of the binder to the entire length of the substrate. The application of the binder to the substrate must be accomplished with one motion, so that a smooth surface is obtained. Allow the test samples to cool to room temperature and trim any excess binder from the edges of the substrate with a hot knife. |
| Procedure | Place the test samples at eye level in the room temperature environmental chamber. Program the chamber to cool at the desired rate. As the temperature of the chamber approaches estimated cracking temperature of the test samples begin observing the surface of the binder for cracks. Samples should be observed at regular intervals, the length of which will depend on the desired precision of the measurement of the cracking temperature. The temperature at which the first crack appears is the Thermal Cracking Temperature. |
| Additional Notes | The first cracks to appear will generally be transverse to the direction of the application of the film. A cooling rate of approximately 5 degrees C. per hour is recommended. This cooling rate is both experienced in the field and convenient to use in the lab. Preliminary screening has shown that results for both modified and unmodified asphalts are relatively |

-continued independent of cooling rate for rates between 5 and 20 degrees C. per hour

EXAMPLE 1a

Comparison of Low PSC SEBS's (Hydrogenated Styrene-Butadiene-Styrene Block Copolymer): Proof that Linear, Radial and Star Block Copolymers Perform Similarly at Equivalent Contour Arm Structure

TABLE 2

| Polymer | Type | Contour Arm Molecular Weight | PSC (%) | Styrene Block Molecular Weight |
|---|---|---|---|---|
| Polymer 1 | Linear Sequential SEBS | 165,000 | 22 | 18,100 |
| Polymer 2 | Linear Sequential SEBS | 244,000 | 17 | 20,700 |
| Polymer 3 | Radial 3 Armed (SEB)$_x$ | 205,000 | 20 | 20,500 |

Blends

4% Polymer/DP AC-5 (Deer Park AC-5 Asphalt) blends, were prepared with high shear mixing with a laboratory Silverson mixer at 5,000 rpm, 220° C. for 25 minutes. No RTFO was performed. The blends were then tested by the Rheometrics procedure discussed above. This example was done with high shear mixing at high temperature to get rid of ease of mixing as a variable and to make the point about contour arm structure. Later examples were carried out with low shear mixing because in paving applications, mixability is a key variable and is a key performance variable.

TABLE 3

| Polymer | Rheometrics 60° C. Frequency Sweep | | | |
|---|---|---|---|---|
| | 0.1 Rad/Sec | | 1.0 Rad/Sec | |
| | G'(Pa) | G*(Pa) | G'(pa) | G*(Pa) |
| Polymer 1 | 420 | 431 | 560 | 670 |
| Polymer 2 | 320 | 355 | 570 | 780 |
| Polymer 3 | 390 | 400 | 530 | 640 |

G* is the shear modulus and G' is the elastic component of the shear modulus. Since the elastic component of the shear modulus, G', is very similar for all three polymers it can be concluded that polymers 1, 2 and 3 perform similarly. The small differences in performance can be explained by the small differences in polymer PSC, block size and the fact that polymer 3 does contain approximately 17% uncoupled polymer. Thus, at equivalent contour arm structure, linear, radial and star polymers perform similarly even though radial and star polymers have much higher total molecular weight. Note when comparing these results to subsequent examples that the high values of G' and G* were obtained most likely because the experiments were carried out with high shear mixing at high temperatures.

EXAMPLE 1b

Comparison of Linwear and Radial SBS's (Unhydrogenated Styrene-Butadiene-Styrene Block Copolymers) at Approximately 30% PSC (Polystyrene Content): Further Evidence That Linear, Radial and Star Block Copolymers Perform Similarly at Equivalent Contour Arm Structure

TABLE 4

| Polymer | Type | Contour Arm Molecular Weight | PSC (%) | Styrene Block Molecular Weight |
|---|---|---|---|---|
| Polymer 4 | Linear Coupled SBS | 113,000 | 31 | 16,200 |
| Polymer 5 | Radial 3 & 4 Armed (SB)$_x$ | 134,000 | 31 | 20,700 |
| Polymer 6 | Radial 4 Armed (SB)$_x$ | 127,000 | 35 | 24,500 |

Blends

The blends are 4% polymer/Deer Park AC-5 blends prepared with low shear mixing (using a laboratory Lightnin mixer) of round and sieved polymer at 600 rpm and 180° C. The completion of mixing was judged visually by the time at which the appearance no longer changed. The mixing times were 100 minutes for polymer 4, 220 minutes for polymer 5 and 240 minutes for polymer 6. No RTFO was carried out. The blends were then tested by the Rheometrics procedure discussed above.

TABLE 5

| Polymer | Rheometrics 60° C. Frequency Sweep | | | |
|---|---|---|---|---|
| | 0.1 Rad/Sec | | 1.0 Rad/Sec | |
| | G'(Pa) | G*(Pa) | G'(Pa) | G*(Pa) |
| Polymer 4 | 117 | 130 | 205 | 340 |
| Polymer 5 | 174 | 183 | 262 | 392 |
| Polymer 6 | 261 | 268 | 365 | 483 |

See FIG. 1. The rheological properties of blends using polymers 4, 5 and 6 correlate with styrene block molecular weight even though polymer 4 is linear, polymer 5 is a mixture of 3 and 4 armed radials and polymer 6 is primarily a 4 armed radial polymer. This is further evidence that linear, radial and star block copolymers perform similarly at equivalent contour arm structure.

EXAMPLE 2a

The Properties of Hydrogenated Block Copolymers Cannot be Predicted From the Properties of Unhydrogenated Block Copolymers: Comparison of Polymers at Approximately 30% PSC Unhydrogenated Polymers: Polymers 4, 5, and 6
Hydrogenated Polymers:

TABLE 6

| Polymer | Type | Contour Arm Molecular Weight | PSC (%) | Styrene Block Molecular Weight |
|---|---|---|---|---|
| Polymer 7 | Linear Sequential SEBS | 68,000 | 29 | 10,100 |
| Polymer 8 | Linear Sequential SEBS | 91,000 | 31 | 14,900 |
| Polymer 9 | Linear Sequential SEBS | 120,000 | 31 | 18,400 |

TABLE 6-continued

| Polymer | Type | Contour Arm Molecular Weight | PSC (%) | Styrene Block Molecular Weight |
|---------|------|------------------------------|---------|-------------------------------|
| Polymer 10 | Linear Sequential SEBS | 152,000 | 33 | 25,000 |
| Polymer 11 | Linear Sequential SEBS | 182,000 | 33 | 29,000 |

Blends

Blends were prepared of 4% polymer/Deer Park AC-5 asphalt with low shear mixing of ground and sieved polymer at 600 rpm and 200° C. The mixing temperature used for the hydrogenated polymers was slightly higher than that used for the unhydrogenated polymers. The reason, as will be discussed below, is that the high molecular weight hydrogenated polymers separate out of some asphalts easily, unlike their unhydrogenated counterparts. To give them the best chance to mix, they were mixed at the slightly higher temperature of 200° C. Unhydrogenated polymers cannot be mixed at that temperature because they will degrade. When polymer 9 is mixed at the same 180° C. mixing temperature as polymer 4, it has a similar mixing time of approximately 100 minutes. The rheological properties of polymer 9 did not depend upon whether it was mixed at 180° C. or 200° C.

The mix times for these polymers were 10 minutes for polymer 7, 15 minutes for polymer 8, 20 minutes for polymer 9, 70 minutes for polymer 10 and 120 minutes for polymer 11. We point out that the big difference between polymers 9 and 10 in mix time is dramatic. Blends made with polymers 10 and 11 immediately became grainy once stirring was stopped and over time a polymer rich phase separated and floated on the top of the blend. To quantify this phenomenon, we developed a compatibility test run as follows:

A small paint can was fitted with a tared device consisting of a ten-mesh circular screen with three copper wires attached. The screen was placed in the bottom of the can and the copper wires were twisted together above the top of the can to make a retrievable handle. The blend to be tested was reheated to 180° C. and remixed for 10 minutes using a high shear mixer at 3,000 rpm. 300 grams of the blend was then poured into the can and allowed to cool overnight. Next, the can was placed in a 160° C. oven for 2 hours. The can was then removed and the screen was lifted from the can. After it cooled, the screen was weighted to determine the amount of blend retained on it. The retention weight was found to correlate with both the blend viscosity/consistency and the amount of polymer rich skin floating on top. The results for the polymers were recorded in grams retained: 6.4 for polymer 7, 7.7 for polymer 8, 10.3 for polymer 9, 57.3 for polymer 10 and 70.7 for polymer 11. Visually, only polymers 10 and 11 showed a phase separated polymer rich skin on top. That is why the retention weight jumps dramatically between polymers 9 and 10.

The blends were then tested according to the Rheometrics procedure discussed above. No RTFO was performed.

TABLE 7

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 181 | 197 | 297 | 404 |
| Polymer 8 | 185 | 195 | 288 | 396 |
| Polymer 9 | 159 | 170 | 256 | 383 |
| Polymer 10 | 194 | 205 | 295 | 400 |
| Polymer 11 | 183 | 195 | 283 | 391 |

See FIG. 2. Clearly the properties of asphalt blends made with hydrogenated block copolymers cannot be predicted from those made with unhydrogenated analogs. Interestingly, the properties of these blends made with hydrogenated block copolymers are relatively independent of polymer structure. A possible explanation which has not been proven is that the hydrogenated block copolymers of this example are not as swollen up with asphalt components as the corresponding unhydrogenated analogs. This is consistent with the above observation that hydrogenated block copolymers are not as compatible as their unhydrogenated analogs.

EXAMPLE 2b

The Effect of RTFO on the Properties of Asphalt Blends Made With Hydrogenated Block Copolymers Example 2a was repeated except that prior to analyzing the blends by Rheometrics, the blends were treated by the laboratory rolling thin film oven aging process (RTFO). This process simulates the oxidative treatment asphalt undergoes during hot mix asphalt concrete processing. It was expected prior to this study that hydrogenated block copolymers would have an advantage over unhydrogenated block copolymers because of the enhanced oxidative stability of the hydrogenated polymers, as is clearly stated in the prior art. It is unexpected that hydrogenated block copolymers would perform so differently than unhydrogenated block copolymers when oxidative stability was not an issue, as in Example 2a. It is also unexpected how the performance of hydrogenated block copolymers would change as a result of processing (RTFO) as seen below. The rheology of the blends after RTFO is shown in the following table and in FIG. 3.

TABLE 8

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 27 | 68 | 110 | 411 |
| Polymer 8 | 84 | 113 | 201 | 478 |
| Polymer 9 | 139 | 170 | 300 | 592 |
| Polymer 10 | 40 | 78 | 124 | 421 |
| Polymer 11 | 25 | 67 | 98 | 445 |

The RTFO process, like hot mix asphalt concrete processing, can change the properties of a polymer modified asphalt by a number of mechanisms. The viscosity of the starting neat asphalt is increased due to oxidative aging, the polymer can degrade, there can be phase coarsening of a polymer rich phase so that it becomes less continuous and the polymer can actually demix as is found in the compatibility test shown above. Interestingly, although polymers 7 through 11 are oxidatively stable during processing, their blends show property changes as a result of RTFO. As shown in Example 2a in the compatibility test, it is likely that polymers 10 and 11 demix from asphalt/Deer Park AC-5 during the RTFO process, leading to the drop in rheological properties and especially in G'. On the other hand, it is believed but not proven that blends made with lower molecular weight hydrogenated block copolymers can have their polymer rich phase become less continuous as a result of RTFO, thus leading to a drop in rheological properties and especially G'. This phase coarsening is expected to become worse as the blend viscosity drops, i.e., as the hydrogenated block copolymer contour molecular weight drops. Thus, there are two competing effects: phase coarsening and gross polymer demixing. This results in an optimum hydrogenated block copolymer choice as shown in FIG. 3. The contour arm molecular weight at the peak of the curve is approximately 120,000.

EXAMPLE 3

Effect of Asphalt Type

Polymers 7-11 were then mixed in a more compatible asphalt, Martinez AR-1000 (MAR AR-1000) and a less compatible asphalt, Deer Park AC-20 (DP AC-20) and tested according to the methods used in Examples 2a and 2b. The results obtained are given in the following tables and FIGS. 4, 5 and 6. We have decided to plot the results versus the total molecular weight. Since all polymers have approximately the same PSC, the plots would look the same if they were made by plotting the results versus the styrene block molecular weight as in the previous examples.

TABLE 9

| Polymer | Mix Times (Min) | | Compatibility (% Retained) | |
|---|---|---|---|---|
| | DP AC-20 | MAR AR-1000 | DP AC-20 | MAR AR-1000 |
| Polymer 7 | 22 | 12 | 6.4 | 4.0 |
| Polymer 8 | 30 | 17 | 8.5 | 6.5 |
| Polymer 9 | 40 | 16 | 34.9 | 7.1 |
| Polymer 10 | 130 | 30 | 61.2 | 13.4 |
| Polymer 11 | 300* | 55 | 46.6 | 18.3 |

*Still very inhomogeneous
MAR AR-1000 Blends Before RTFO

TABLE 10

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 441 | 483 | 684 | 809 |
| Polymer 8 | 271 | 284 | 404 | 554 |
| Polymer 9 | 242 | 253 | 359 | 510 |
| Polymer 10 | 217 | 231 | 334 | 483 |
| Polymer 11 | 181 | 197 | 300 | 461 |

MAR AR-1000 Blends After RTFO

TABLE 11

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 139 | 190 | 339 | 687 |
| Polymer 8 | 183 | 207 | 331 | 626 |
| Polymer 9 | 139 | 169 | 294 | 614 |
| Polymer 10 | 225 | 248 | 383 | 651 |
| Polymer 11 | 194 | 224 | 355 | 628 |

DP AC-20 Blends Before RTFO

TABLE 12

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 61 | 154 | 247 | 968 |
| Polymer 8 | 108 | 181 | 313 | 956 |
| Polymer 9 | 162 | 233 | 405 | 1051 |
| Polymer 10 | 196 | 265 | 449 | 1090 |
| Polymer 11 | 203 | 278 | 475 | 1146 |

DP AC-20 Blends After RTFO

TABLE 13

| | Rheometrics 60° C. Frequency Sweep | | | |
|---|---|---|---|---|
| | 0.1 Rad/Sec | | 1.0 Rad/Sec | |
| Polymer | G'(Pa) | G*(Pa) | G'(Pa) | G*(Pa) |
| Polymer 7 | 13 | 148 | 124 | 1331 |
| Polymer 8 | 87 | 263 | 424 | 1713 |
| Polymer 9 | 100 | 255 | 391 | 1608 |
| Polymer 10 | 32 | 198 | 231 | 1583 |
| Polymer 11 | 37 | 213 | 295 | 1693 |

The mixing results show that polymers 10 and 11 are extremely difficult to mix into DP AC-5 and DP AC-20. This is consistent with the compatibility results which show that polymers 10 and 11 easily demix during processing from DP AC-5 while polymers 9, 10 and 11 easily demix during processing from DP AC-20.

The post RTFO rheological results are also controlled by the demixing phenomenon for high molecular weight polymer in DP AC-5 and DP AC-20. For low molecular weight polymers, phase coarsening is likely heavily influencing properties in the less compatible DP AC-5 and DP AC-20 asphalts. These effects are much less important for the more compatible MAR AR-1000 asphalt. Based on rheological performance only, all of the polymers work well with MAR AR-1000 asphalt, while only polymers 8 and 9 performed well with DP AC-5 and DP AC-20.

THE MOST COMPATIBLE ASPHALT IS NOT ALWAYS THE BEST CHOICE

Based on the above results, it would appear that one should always choose the most compatible asphalt (low asphaltenes). However, there are other performance criteria in addition to mixability, compatibility and rheological performance (high temperature resistance to loads, for example, rutting resistance) in HMAC. Sometimes, the most compatible asphalt does not perform the best in all properties. Thus, depending upon the specific application, different optimum combinations of polymers and asphalt are required. In addition, it must be noted that most performance attributes improve with polymer content but extremely high polymer loadings may be undesirable due to cost considerations. Block copolymers have been added to HMAC and have given easily processable asphalt binders at levels between 0.5 weight percent and 12 weight percent block copolymer.

An example of a case in which the most compatible asphalt may not be desirable is when a HMAC road overlay must be extremely resistant to low temperature thermal cracking caused by thermal contraction effects alone (no traffic loads). The following table shows the effect of asphalt choice and polymer loading on thermal cracking.

TABLE 14

| Asphalt | Polymer | Loading (%) | Post RTFO Cracking Temperature (°F.) |
|---|---|---|---|
| Martinez AR-1000 | — | — | −22 |
| Deer Park AC-20 | — | — | −28 |
| Deer Park AC-5 | — | — | −30 |
| Deer Park AC-5 | Polymer 9 | 2 | −30 |
| Deer Park AC-5 | Polymer 9 | 4 | −32 |
| Deer Park AC-5 | Polymer 9 | 6 | −45 |

In cases where resistance to thermal cracking is the main performance criterion, polymer 9 at high loadings in Deer Park AC-5 could be the best choice.

EXAMPLE 4

Effect of Asphalt PEN

U.S. Pat. No. 4,172,061 discloses asphaltic concrete compositions which utilize a hydrogenated block copolymer having a molecular weight of from about 50,000 to about 500,000 and more preferably from about 70,000 to about 150,000. The asphalts utilized in U.S. Pat. No. 4,172,061 are stated to be 85–100 PEN asphalts. The data set forth below proves that improved rutting resistance, as evidenced by higher values of G', are achieved when the polymer compositions of the present invention are utilized with asphalts having a PEN of greater than 100.

All of the asphalt blends shown below contain 4% of polymer 9 and the rest asphalt and were processed by RTFO. The rheology results are from a rheometrics 60° C. frequency sweep.

TABLE 15

| Asphalt | Asphalt Penetration, dmm (PEN at 100 gm, 5 sec, 25° C.) | G' at 0.1 rad/sec, Pa |
|---|---|---|
| Mar AR 1000 | 117 | 139 |
| | | 210 (read off smooth plot in FIG 6) |
| DP AC 5 | 150 | 139 |
| | | 195 (repeat measurement) |
| DP AC 10 | 97 | 49 |
| DP AC 20 | 55 | 100 |

Asphalts DP AC 10 and DP AC 20 both have PENs of less than 100. DP AC 10 must be very similar to the asphalt used in U.S. Pat. No. 4,172,061 since it has a PEN within the range specified in that patent. It can clearly be seen that the asphalts with PENs greater than 100, Mar AR 1000 and DP AC 5, have much higher values of G' and thus these compositions would exhibit increased rutting resistance with respect to the compositions utilizing the other two asphalts. This effect is not only found with polymer 9 but all of the polymers tested herein. In looking at FIG. 6, it can be seen that the curve of G' versus molecular weight for asphalt DP AC 20, having a PEN of less than 100, is noticeably beneath the curves of the other two asphalts which have PENs of greater than 100.

We claim:

1. A paving composition with improved rutting resistance comprising:
   (a) from about 80 parts to about 99 parts per hundred of aggregate, and
   (b) from about 1 part to about 20 parts per hundred of a bituminous composition which is comprised of
   (1) from about 88 to about 99.5 parts per hundred of a bituminous component having a PEN of greater than about 100 and
   (2) from about 0.5 parts to about 12 parts per hundred of a linear hydrogenated block copolymer of a monoalkenyl aromatic hydrocarbon and a conjugated diolefin having a contour arm molecular weight before hydrogenation of from about 80,000 to about 150,000 and and a polystyrene content of from about 20% to about 40% the molecular weights referred to herein are peak molecular weights determined by gel permeation chromatography (GPC).

2. The composition of claim 1 wherein the polystyrene content is from about 25% to about 40%.

3. The composition of claim 2 wherein the bituminous component is an asphalt containing more than about 11% n-pentane asphaltenes and the molecular weight of the hydrogenated block copolymer before hydrogenation is from about 110,000 to about 125,000 the molecular weights referred to herein are peak molecular weights determined by gel permeation chromatography (GPC).

4. The composition of claim 3 wherein the molecular weight of the block copolymer is from about 110,000 to about 125,000 the molecular weights referred to herein are peak molecular weights determined by gel permeation chromatography (GPC).

5. The composition of claim 4 wherein the bituminous composition contains from about 1 part to about 7 parts per hundred of the hydrogenated block copolymer.

6. The composition of claim 2 wherein the bituminous component is an asphalt containing less than about 11% n-pentane asphaltenes and the molecular weight of the hydrogenated block copolymer before hydrogenation is from about 90,000 to about 150,000 the molecular weights referred to herein are peak molecular weights determined by gel permeation chromatography (GPC).

7. The composition of claim 6 wherein the molecular weight of the block copolymer is from about 110,000 to about 125,000 the molecular weights referred to herein are peak molecular weights determined by gel permeation chromatography (GPC).

8. The composition of claim 7 wherein the bituminous composition contains from about 1 part to about 7 parts per hundred of the hydrogenated block copolymer.

9. The composition of claim 1 wherein the paving composition contains from about 2 parts to about 8 parts per hundred of the bituminous composition.

10. A bituminous composition for use in paving applications to achieve increased rutting resistance which comprises
   (a) from greater than about 93 parts to about 99 parts per hundred of a bituminous component having a PEN of greater than 100 and
   (b) from about 1 part to less than about 7 parts per hundred of a linear hydrogenated block copolymer of a monoalkenyl aromatic hydrocarbon and a conjugated diolefin having a contour molecular weight before hydrogenation of from about 80,000 to about 150,000 and a polystyrene content of from about 25% to about 40% the molecular weights referred to herein are peak molecular weights determined by gel permeation chromatography (GPC).

11. The composition of claim 10 wherein the bituminous component is an asphalt containing more than about 11% n-pentane asphaltenes and the molecular weight of the hydrogenated block copolymer is from about 80,000 to 130,000 the molecular weights referred to herein are peak molecular weights determined by gel permeation chromatography (GPC).

12. The composition of claim 10 wherein the bituminous component is an asphalt containing less than about 11% n-pentane asphaltenes and the molecular weight of the hydrogenated block copolymer is from about 90,000 to about 150,000 the molecular weights referred to herein are peak molecular weights determined by gel permeation chromatography (GPC).

13. A process for paving a surface with improved rutting resistance which comprises:
   (a) providing a paving composition comprising
      (1) from about 80 parts to about 99 parts per hundred of aggregate, and
      (2) from about 1 part to about 20 parts per hundred of a bituminous composition which is comprised of
         (i) from about 88 parts to about 99.5 parts per hundred of a bituminous component having a PEN of greater than 100 and
         (ii) from about 0.5 to about 12 parts per hundred of a linear hydrogenated block copolymer of a monoalkenyl aromatic hydrocarbon and a conjugated diolefin having a contour molecular weight before hydrogenation of from about 80,000 to about 150,000 and a polystyrene content from about 20% to about 40%, and
   (b) applying the paving composition to a surface the molecular weights referred to herein are peak molecular weights determined by gel permeation chromatography (GPC).

14. The process of claim 13 wherein the styrene content is from about 25% to about 40%.

15. The process of claim 13 wherein the bituminous composition contains from about 1 part to about 7 parts per hundred of the hydrogenated block copolymer.

16. The process of claim 15 wherein the paving composition contains from about 2 parts to about 8 parts per hundred of the bituminous composition.

17. The composition of claim 10 wherein the molecular weight of the hydrogenated block copolymer is from about 110,000 to about 125,000 the molecular weights referred to herein are peak molecular weights determined by gel permeation chromatography (GPC).

18. The process of claim 13 wherein the molecular weight of the hydrogenated block copolymer is from about 110,000 to about 125,000 the molecular weights referred to herein are peak molecular weights determined by gel permeation chromatography (GPC).

19. The composition of claim 12 wherein the molecular weight of the block copolymer is from about 110,000 to about 125,000 the molecular weights referred to herein are peak molecular weights determined by gel permeation chromatography (GPC).

* * * * *